(12) United States Patent
Blomqvist et al.

(10) Patent No.: US 12,370,605 B2
(45) Date of Patent: Jul. 29, 2025

(54) CUTTING TOOL (71) Applicant: AB SANDVIK COROMANT, Sandviken (SE)

(72) Inventors: Andreas Blomqvist, Stockholm (SE); Jose Luis Garcia, Stockholm (SE); Erik Holmstrom, Stockholm (SE)

(73) Assignee: AB Sandvik Coromant, Sandviken (SE)

( * ) Notice: Subject to any disclaimer, the term of this patent is extended or adjusted under 35 U.S.C. 154(b) by 432 days.

(21) Appl. No.: 17/787,441

(22) PCT Filed: Dec. 17, 2020

(86) PCT No.: PCT/EP2020/086730
§ 371 (c)(1),
(2) Date: Jun. 20, 2022

(87) PCT Pub. No.: WO2021/122966
PCT Pub. Date: Jun. 24, 2021

(65) Prior Publication Data
US 2023/0037384 A1 Feb. 9, 2023

(30) Foreign Application Priority Data
Dec. 20, 2019 (EP) .................................... 19218913

(51) Int. Cl.
*B23B 27/14* (2006.01)

(52) U.S. Cl.
CPC ..... *B23B 27/148* (2013.01); *Y10T 428/12056* (2015.01); *Y10T 428/12576* (2015.01)

(58) Field of Classification Search
None
See application file for complete search history.

(56) References Cited

U.S. PATENT DOCUMENTS

| | | | |
|---|---|---|---|
| 3,573,023 A | 3/1971 | Thomas et al. | |
| 7,476,064 B2 * | 1/2009 | Ishii | C23C 30/005 |
| | | | 407/119 |

(Continued)

FOREIGN PATENT DOCUMENTS

| | | |
|---|---|---|
| CN | 1268192 A | 9/2000 |
| CN | 1950529 A | 4/2007 |

(Continued)

OTHER PUBLICATIONS

Wang et al. "Effect of shot peening on the residual stresses and microstructure of tungsten cemented carbide", Materials and Design 95, 2016, pp. 159-164.

(Continued)

*Primary Examiner* — Seth Dumbris
(74) *Attorney, Agent, or Firm* — Corinne R. Gorski (57) ABSTRACT

A cutting tool includes a cemented carbide substrate. The cemented carbide consists of hard constituents in a metallic binder. The hard constituents include WC. The WC content in the cemented carbide is 80-93 wt %. The cemented carbide has Ni and Al, and a Ni content of 3-13 wt %, a weight ratio of Co/Ni<0.33, a weight ratio of Fe/Ni<0.25, a weight ratio of Cr/Ni<0.25 and a weight ratio of 0.02<Al/(Ni+Co+Fe)<0.1. The crack resistance W is defined as the ratio of the load applied on a Vickers hardness indentation and the total crack length of the cracks formed at the corners of the Vickers hardness indentation. The product of the hardness H(rake) at the rake face and the crack resistance W(rake) at the rake face is H(rake)*W(rake)>5000 HV100*N/μm.

15 Claims, 4 Drawing Sheets

(56) References Cited

U.S. PATENT DOCUMENTS

| | | |
|---|---|---|
| 2003/0129456 A1 | 7/2003 | Keiji et al. |
| 2018/0029118 A1* | 2/2018 | Gries ............... C22C 29/06 |

FOREIGN PATENT DOCUMENTS

| | | | |
|---|---|---|---|
| CN | 105907997 A | * | 8/2016 |
| CN | 107739950 A | | 2/2018 |
| CN | 108463301 A | | 8/2018 |
| CN | 110023522 A | | 7/2019 |
| JP | H07308859 A | | 11/1995 |
| JP | 2002205207 A | | 7/2002 |
| JP | 2009220267 A | | 10/2009 |
| JP | 2012143829 A | | 8/2012 |
| JP | 2013237120 A | | 11/2013 |
| JP | 2014028889 A | * | 2/2014 |

OTHER PUBLICATIONS

Edmilson O. Correa et al "Microstructure and mechanical properties of WC-Ni-Al based cemented carbides developed for engineering applications", International Journal of Materials Research., vol. 102, No. 11, Nov. 1, 2011, pp. 1369-1373.

Minai Zhang et al: "Study on Microstructure and Mechanical Properties of WC-1ONi3Al Cemented Carbide Prepared by Different Ball-Milling Suspension", Materials, vol. 12, No. 14, Jul. 10, 2019, p. 2224.

Xiaoqiang Li et al. "Preparation and mechanical properties of WC-10 Ni3Al cemented carbides with plate-like triangular prismatic WC grains", Journal of Allys and Compounds., vol. 544, Aug. 4, 2012, pp. 134-140.

Enrique Rocha-Rangel: "Fracture Toughness Determinations by Means of Indentation Fracture" In: "Nanocomposites with Unique Properties and Applications in Medicine and Industry", Aug. 23, 2011, InTech, p. 31.

Faksa Lukas et al: "Effect of shot peening on residual stresses and crack closure in CVD coated hard metal cutting inserts", International Journal of Refractory Metals and Hard Materials, vol. 82, Apr. 16, 2019, pp. 174-182.

Chen, Jian. Research on the mechanical properties and anti-oxidation and corrosion resistance of WC-Ni3Al composite materials). China's Excellent Dissertation Full-text Database Engineering Science and Technology Series I), Edition No. 52, Dec. 15, 2013, pp. 13-28.

* cited by examiner

CUTTING TOOL

RELATED APPLICATION DATA

This application is a § 371 National Stage Application of PCT International Application No. PCT/EP2020/086730 filed Dec. 17, 2020 claiming priority to EP 19218913.2 filed Dec. 20, 2019.

TECHNICAL FIELD

The present invention relates to a cutting tool of cemented carbide wherein the cemented carbide comprises a metal binder and hard constituents comprising WC. The crack resistance of the surface area of the cutting tool is higher than the crack resistance in the bulk area of the cutting tool.

BACKGROUND

Cutting tools for metal cutting applications commonly comprise a substrate of cemented carbide. Cemented carbide is a material that shows both high hardness and high toughness and the performance in cutting applications have been successful for decades. To further improve the performance of the cutting tool it is known to coat the tool with a wear resistant coating. It is also known to treat the cutting tool in a process called post treatment, including steps such as wet blasting, dry blasting, edge brushing and/or polishing. These post treatment processes typically change the surface roughness of the cutting tool and/or the residual stresses in the surface area of the cutting tool.

Effects of shot peening of cemented carbide is described by Wang et al., "Effect of shot peening on the residual stresses and microstructure of tungsten cemented carbide", Materials and Design 95, year 2016, pages 159-164. It is shown that compressive residual stresses are induced in the surface layer, both in the Co and in the WC.

There is a continuous need of improving the life times and performance of cutting tools to save time in production and reduce the risks of failure due to broken cutting tools. There is also a need to reduce the amount of Co in the cemented carbide, and to find alternative cemented carbides that can compete with the traditional Co-containing cemented carbide in metal cutting performance.

SUMMARY OF THE INVENTION

It is an object of the present invention to provide a cutting tool with improved resistance to wear in metal cutting applications and it is also an object to provide a method of making the same. It is a further object of the present invention to provide a cutting tool with high resistance to chipping of a coating at the cutting edge. Another object is to provide a turning tool with increased resistance to chipping of the cutting edge and/or breakage of the cutting tool.

The present invention relates to a cutting tool comprising a cemented carbide substrate wherein the cemented carbide consists of hard constituents in a metallic binder, the hard constituents comprise WC and the WC content in the cemented carbide is 80-93 wt %, wherein the cemented carbide comprise Ni and Al, the cemented carbide has a Ni content of 3-13 wt % and a weight ratio of Co/Ni<0.33 and a weight ratio of Fe/Ni<0.25 and a weight ratio of Cr/Ni<0.25 and a weight ratio of 0.02<Al/(Ni+Co+Fe)<0.1, and wherein the cutting tool comprises a rake face, a flank face and a cutting edge there between, wherein the crack resistance W is defined as $$W = \frac{P}{4a}$$

wherein P is the load 100*9.81 N of a Vickers hardness indentation and a is the average crack length [µm] of each crack formed at the corners of the Vickers hardness indentation, and wherein the product of the hardness H(rake) at the rake face and the crack resistance at the rake face is H(rake)*W(rake)>5000 HV100*N/µm, preferably >10 000 HV100*N/µm, more preferably>15 000 HV100*N/µm.

Usually for most technical composite materials, such as cemented carbide materials, an increase in toughness is associated with a decrease in hardness. One way to express the combination of toughness and plastic deformation resistance (i.e. hardness) for cutting tool applications is by making the product of hardness H and crack resistance W, i.e. H*W. The higher the H*W, the more resistant to both crack formation and plastic deformation the cutting tool is. It has unexpectedly been found that very high crack resistance in combination with preserved or increased hardness can be achieved with the inventive process. These properties are advantageous for metal cutting tools since they contribute to increased wear resistance of the tool.

In one embodiment of the present invention the cemented carbide comprises x wt % Ni, y wt % Fe and z wt % Co and wherein 5<x+y+z<10. Cemented carbides within this range of binder content has a good combination of toughness and plastic deformation resistance for cutting tool applications. Depending on the metal cutting application, the amount of binder can be optimized by a person skilled in the art.

In one embodiment of the present invention the metallic binder comprises gamma prime phases. The space group of the gamma prime phase is preferably Pm-3m, preferably with a $L1_2$ crystal structure. To overcome the high creep rate of pure Ni, the targeted additions of Al are set to precipitate gamma prime phases. This has proven to enhance the combination of toughness and plastic deformation resistance. Dislocations in the disordered metallic binder will pin on the intermetallic gamma prime phases due to a difference in length of the Burgers vector. The gamma prime phase is of cubic structure. The gamma prime phases or gamma prime grains or gamma prime precipitates are visible in SEM micrographs.

In one embodiment of the present invention the average grain size of the gamma prime phase is 10-1000 nm in diameter, preferably 15-600 nm. The grain size is measured in a image of a cross section of the substrate using a mean linear intercept method. The grain size of the gamma prime phase has been selected such that the dislocation pinning effect will strengthen the material. An optimum between creation and annhiliation of defects is obtained in this range. To gain benefit from this effect, the size of the phases can be optimized by a person skilled in the art. The size of the gamma prime phase can be adjusted in several alternative ways, such as adding Cr which reduces the size. The size is also dependent on the cooling of the cemented carbide after sintering. A very fast cooling can result in very small gamma prime phases. The size of the gamma prime phases is saturized so a too long cooling time do not change the sizes.

In one embodiment of the invention the metallic binder in the cemented carbide comprises 10-75 vol % gamma prime phase, preferably 15-35 vol %, more preferably. The amount or fraction of the gamma prime phase can be adjusted by changing the Al/(Ni+Co+Fe) ratio such that a higher ratio results in a higher amount or fraction of gamma prime phase.

In one embodiment of the present invention the gamma prime phase comprises Ni₃Al. Preferably the gamma prime comprises Ni₃Al with solubility of elements such as Cr, Co, Fe, Ta, Ti, Hf, W, Mo, V, Mn, Si, Cu. Additional elements can be used to tailor the size, morphology and properties of the gamma prime phase. The influence of each element can be estimated by a person skilled in the art and optimized to specific applications.

In one embodiment of the present invention the hardness of the rake face of the cutting tool is H(rake) and the hardness of the bulk area of the cutting tool is H(bulk) and wherein 0.90<H(rake)/H(bulk)<1.10. A high crack resistance on the surface can be achieved by lowering the hardness but this will however lower the plastic deformation resistance which will be negative for the cutting tool life time. It is advantageous to have a high conform hardness of the bulk and the rake face of the cutting tool.

In one embodiment of the present invention the crack resistance W as measured on the rake face of the cutting tool is W(rake), the W as measured on the flank face of the cutting tool is W(flank), and wherein W(rake)/W(flank)>5, preferably >8, more preferably >10. Cracks that form during metal cutting usually originate on the rake side of the cutting tool, therefore a good crack resistance on the rake face is advantageous for metal cutting applications. Further, cutting tool production process will be relatively simple if only the rake face is to be shot peened, and the flank side is slightly less important.

In one embodiment of the present invention the crack resistance W as measured on the rake face of the cutting tool is W(rake) and the W as measured on the bulk area of the cutting tool is W(bulk) and wherein W(rake)/W(bulk)>5, preferably >8, more preferably >10. Cracks that form during metal cutting usually originate on the rake side of the cutting tool, therefore a good crack resistance on the rake face is advantageous for metal cutting applications. The cracks usually appear in the surface of the cutting tool and not in the bulk, so a high crack resistance in the surface area is advantageous.

In one embodiment of the present invention the compressive residual stress as measured in the surface area on the rake face of the cutting tool is >1500 MPa, preferably >2000 MPa, more preferably >2200 MPa, wherein the stress measurement is made with X-ray diffraction and the $\sin^2\psi$-method using the (2 1 1) reflection of WC. Compressive residual stresses inhibit the formation of cracks. Therefore, increasing the compressive residual stress on the rake face will prolong the tool life of cutting tools in metal cutting applications.

In one embodiment of the present invention the cemented carbide comprise a Ni content of 8-12 wt % and a weight ratio of Co/Ni<0.05 and a weight ratio of Fe/Ni<0.05 and a weight ratio of Cr/Ni<0.02 and a weight ratio of 0.04<Al/(Ni+Co+Fe)<0.07. These compositions are suitable for metal cutting applications demanding high toughness in combination with suitable hardness.

In one embodiment the weight ratio of Fe/Ni<0.02.

In one embodiment of the present invention the cemented carbide comprise a Ni content of 8-12 wt % and a weight ratio of Co/Ni<0.05 and a weight ratio of Fe/Ni<0.05 and a weight ratio of Cr/Ni<0.08 and a weight ratio of 0.04<Al/(Ni+Co+Fe)<0.07. These compositions are suitable for applications demanding high toughness in combination with suitable hardness.

In one embodiment of the present invention the average grain size of the WC in the cemented carbide is 0.2-10 μm, preferably 0.3-5 μm, more preferably 0.5-2 μm. This range of the WC grain size is optimal for cemented carbide aimed at metal cutting inserts. The grain size is measured in a image of a cross section of the substrate using a mean linear intercept method. Depending on the metal cutting application, the WC grain size can be optimimized by a person skilled in the art.

In one embodiment of the present invention the cemented carbide comprise one or more of Ti, Nb, Ta, Mo, W, Re, Ru. These elements can be used for further solid solution or particle strengthening.

The present invention relates to a method of treating a cutting tool comprising a cemented carbide substrate wherein the cemented carbide consists of hard constituents in a metallic binder, the hard constituents comprises WC and the WC content in the cemented carbide is 80-93 wt %, wherein the cemented carbide comprise Ni and Al, the cemented carbide has a Ni content of 3-13 wt % and a weight ratio of Co/Ni<0.33 and a weight ratio of Fe/Ni<0.25 and a weight ratio of Cr/Ni<0.25 and a weight ratio of 0.02<Al/(Ni+Co+Fe)<0.1, wherein the cutting tool (1) comprises a rake face (2), a flank face (3) and a cutting edge there between, and wherein shot peening is performed at least on the rake face (2) the method comprises a step of shot peening the rake face of the cutting tool. The shot peening increases the crack resistance of the surface while the hardness is maintained, thereby improving the combination of hardness and crack resistance.

In one embodiment of the present invention the shot peening is performed at a temperature of 100-600° C., preferably 200-550° C., more preferably 300-500° C. The shot peening of the present invention is in one embodiment performed at an elevated temperature, and this temperature is herein defined as the temperature that the material (the portion of the cutting tool) that is shot peened is at during the shot peening. Several methods can be used to create the elevated temperature of the cutting tool portion, such as induction heating, resistance heating, pre-heating on a hot surface/oven, laser heating etc. The cutting tool can alternatively be heated in a separate step prior to the shot peening step.

The temperature is suitably measured on the substrate by any method suitable for measuring temperature. Preferably, an infrared temperature measurement device is used.

The portion of the substrate that is subjected to shot peening is at said temperature. It has unexpectedly been found that treating a cutting tool to shot peening when it is heated increases its crack resistance in the surface area which is an important property for increasing the lifetime of a cutting tool.

In one embodiment of the present invention the edge rounding, ER, of at least a part of said cutting edge is between 10 μm and 50 μm, preferably between 20 μm and 40 μm. It has surprisingly been found that the cutting tools made according to present method is performing well on cutting tools with this ER.

DEFINITIONS

"Cemented carbide" is a material comprising hard constituents distributed in a continuous metallic binder or forming a skeleton embedded in a continuous metallic binder. The hard constituents mainly comprise WC. This kind of material has properties combining a high hardness from the hard constituents with a high toughness from the metallic binder and is suitable as a substrate material for metal cutting tools.

By the "composition of" or "content in" the cemented carbide is herein meant the average composition or the average content in the cemented carbide substrate. For example a gradient in the surface area, such as 15-30 µm from the surface of the substrate towards the bulk, with a locally higher metallic binder content does not change the average composition of the cemented carbide substrate of the cutting tool since the cutting tool is at least several mm in dimension.

The "metallic binder" of the cemented carbide can comprise elements that are dissolved in the metallic binder during sintering, such as W and C originating from the WC. Depending on what types of hard constituents that are present, also other elements can be dissolved in the binder.

By "cutting tool" is herein meant a cutting tool for metal cutting applications such as an insert, an end mill or a drill. The application areas can be turning, milling or drilling.

"ER" is a value of the edge rounding intended to indicate the sharpness of the edge. Larger values of ER represent a rougher shape of the cutting edge while a smaller value of ER represent a sharp cutting edge.

Figure 1:
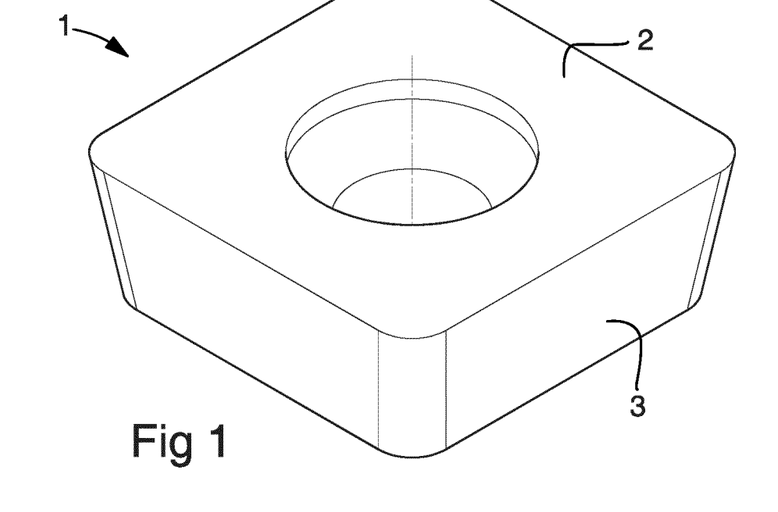
FIG. 1 is a general view of a cutting tool insert 1, provided with a rake face 2, a flank face 3 and cutting edge provided therebetween.
Figure 2:
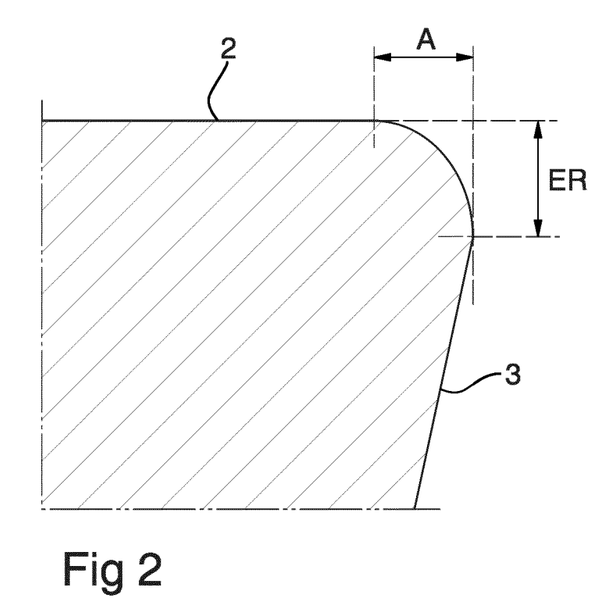
FIG. 2 is a general view of a cross section of a cutting edge wherein the edge rounding, ER, is indicated and also the width, A, of the cutting edge is shown schematically.
Figure 3:
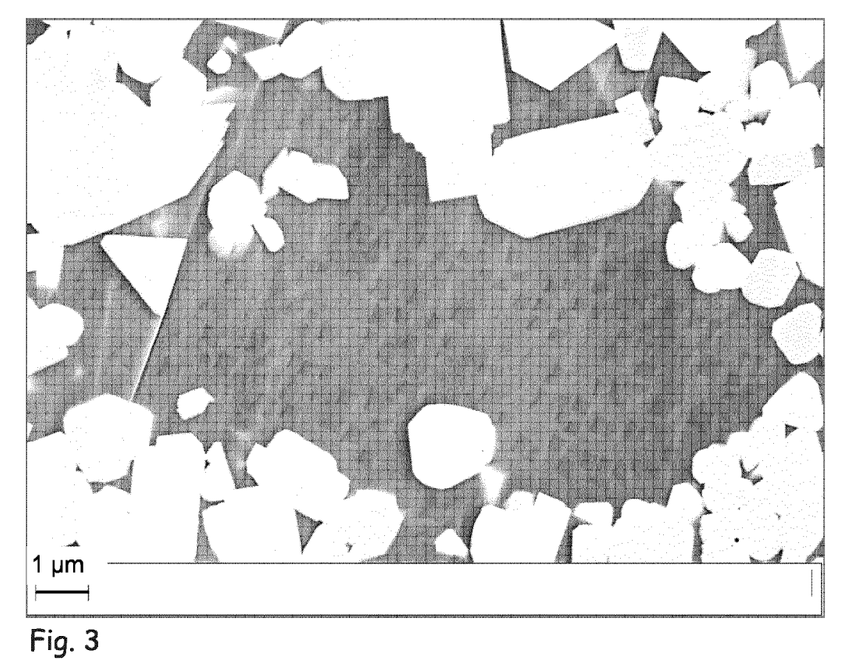
FIG. 3-4 are SEM micrograph of a cross section of the cemented carbide of the cutting tool Invention 1. Gamma prime phase is visible as grey squares in the binder phase.
Figure 4:
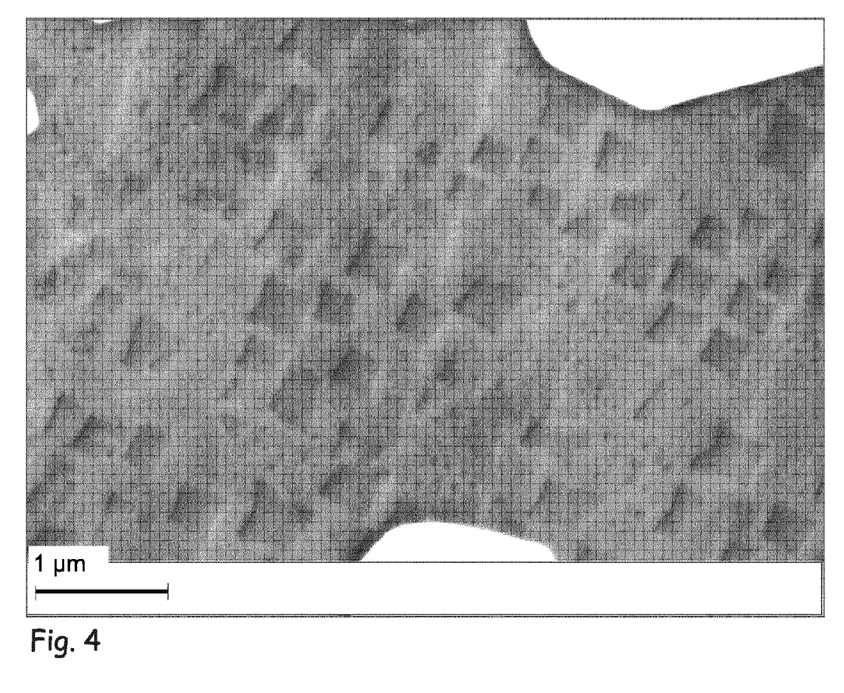
Figure 5:
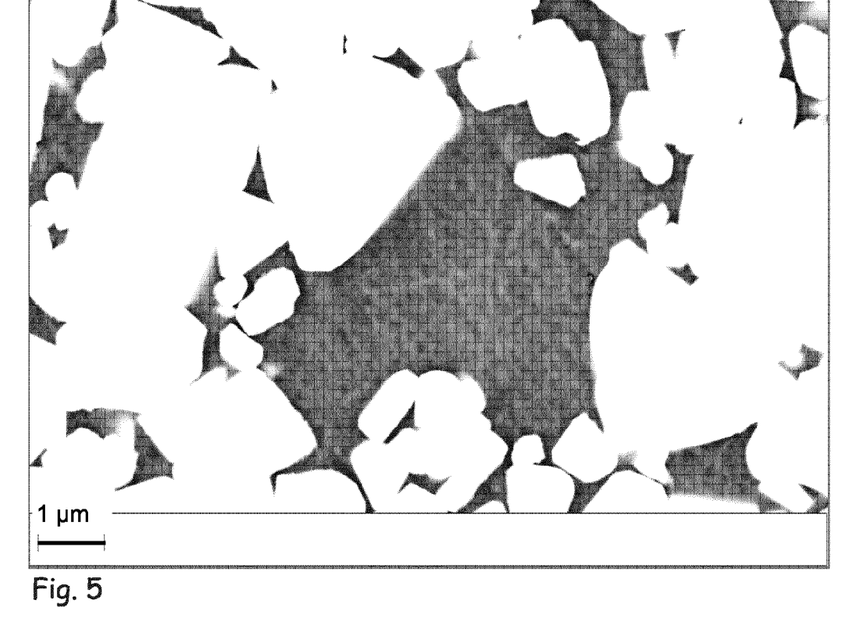
FIG. 5-6 are SEM micrograph of a cross section of the cemented carbide of the cutting tool Invention 2. Gamma prime phase is visible as grey squares in the binder phase.
Figure 6:
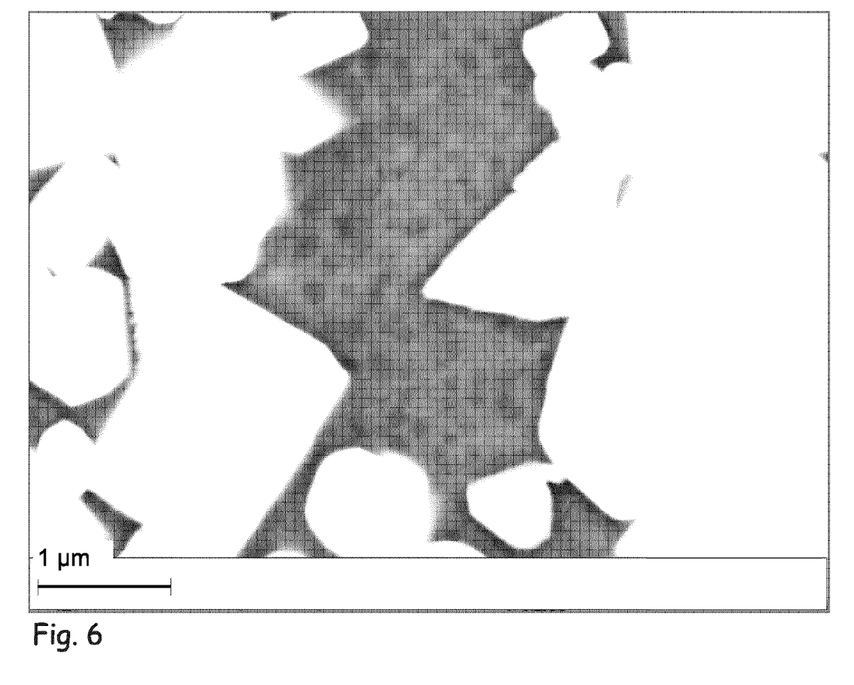

ER is herein defined as a value as calculated according to the following:
- put the cutting tool on a flat surface on its bearing surface or the corresponding surface of the cutting tool.
- align a first plane along the side of the cutting tool perpendicular to said flat surface, in contact with the edge to measure, for example along the flank face 3 of the cutting tool 1,
- align a second plane in parallel with said flat surface and intersecting at an intersection point said first plane, said second plane being in contact with the edge to measure at a contact point, for example said second plane is aligned along the rake face 2 of the cutting tool 1.

The value "ER" is equal to the distance between the intersection point between the first and the second plane and the point of contact between the first plane and the cutting tool, close to the edge, see FIG. 2.

"Shot blasting" is herein meant a process using abrasive grains wherein material typically is removed from the treated surface by abrasive wear. Shot blasting is well known in the field of cutting tools and is for example known to introduce residual stresses in a coating on a cutting tool.

By "shot peening" is herein meant that the surface of a cutting tool is bombarded with a media comprising particles, such as beads, that are non-abrasive and that typically have a round shape.

The media can be beads of a hard material such as an oxide, steel or cemented carbide.

By the term "bulk" is herein meant the innermost part (centre) of the cutting tool.

By the term "surface area" is herein meant the outer portion of the substrate which is influenced by the shot peening process disclosed herein.

FURTHER EMBODIMENTS OF THE INVENTION

In one embodiment of the present invention the shot peening is performed with ceramic beads, preferably with beads comprising $ZrO_2$, $SiO_2$ and $Al_2O_3$.

In one embodiment of the present invention the shot peening is performed with beads of a diameter of about 50-200 µm. If the beads are too large the risk of damaging the cutting edge is increased. If the beads are too small the energy and impact transferred from the media to the substrate is less pronounced. The impact or energy from the beads during the shot peening should not be too high since this would increase the risk of damaging the surface and the cutting edge of the cutting tool. The impact or energy from the beads should neither be too low since then the technical effect would not be achieved. If the beads are too large the risk of damaging the cutting edge is increased. If the beads are too small the energy and impact transferred from the media to the substrate is less pronounced. A suitable size of the beads is related to the material of the beads and is to be selected by the skilled person.

In one embodiment of the present invention, the cemented carbide further comprises a cubic phase, sometimes called gamma phase, which is a solid solution of cubic carbides and/or carbonitrides of one or more elements selected from Ti, Ta, Nb, Hf, Zr, V and Cr. The amount of cubic phase, in area % is suitably from 2 to 25%, preferably between 3 to 15%. This can be measured in different ways but one way is to perform an image analysis of either a Light Optical Microscope image or a Scanning Electron Microscope (SEM) micrograph of a cross section of the substrate to calculate the average fraction of gamma phase.

In one embodiment of the present invention, the cemented carbide comprises a cubic phase and a binder phase enriched surface zone depleted from cubic phase. The thickness of the surface zone is suitably from 2 to 100 µm, preferably from 3 to 70 µm and more preferably from 8 to 35 µm. The thickness is determined by measuring on a SEM or LOM image of a cross section of the substrate. Those measurements should be performed in areas where the substrate surface is reasonably flat, i.e. not close to the edge, at least 0.3 mm from the cutting edge, or nose etc. in order to get a true value. The boundary between the surface zone and the bulk is determined by the absence/presence of cubic phase which is usually quite distinct when observing a cross-section of the substrate in a SEM or LOM image. The thickness is determined by the distance between the surface and the boundary between the surface zone and the bulk. By binder enriched is herein meant that the binder phase content in the surface zone is suitably from 1.05 to 1.65 times, preferably from 1.1 to 1.5 times the binder phase content in the bulk. The binder phase content in the surface zone is suitably measured at a depth of half the total thickness/depth of the surface zone. All measurements performed on the bulk should be performed at an area not too close to the surface zone. By that is herein meant that any measurements done to the microstructure of the bulk should be performed at a depth of at least 200 µm from the surface.

By surface zone depleted of cubic phase is herein meant that the surface zone contains no, or very few cubic phase particles, i.e. less than 0.5 area %.

In one embodiment of the present invention the cutting tool is provided with a coating. The coating can be a colour layer or a wear resistant coating.

In one embodiment of the present invention the thickness of the coating is 2-20 μm, preferably 5-10 μm.

In one embodiment of the present invention the coating is a CVD coating or a PVD coating, preferably said coating comprising one or more layers selected from TiN, TiCN, TiC, TiAlN, $Al_2O_3$ and ZrCN. The coating is preferably a CVD coating comprising a TiCN layer and a $Al_2O_3$ layer.

In one embodiment of the present invention, the cemented carbide substrate is provided with a wear resistant PVD coating, suitably being a nitride, oxide, carbide or mixtures thereof of one or more of the elements selected from Al, Si and groups 4, 5 and 6 in the periodic table.

In one embodiment of the present invention the cutting tool comprises a rake face, a flank face and a cutting edge there between, and wherein said shot peening is performed at least on the rake face. Rake face peening is advantageous in that it is at the rake face that the working material hits the cutting tool during the cutting operation and that the mechanisms during peening that is influencing the substrate is therefore applied at a relevant area or volume of the substrate. It is further advantageous to apply the shot peening at the rake face since for many cutting tool geometries this imply treating several cutting edges at the same time.

In one embodiment of the present invention the shot peening is performed on heated cutting tools, the method comprises a step prior to the shot peening wherein said cutting tools are heated.

In one embodiment of the present invention the method further comprises a step of shot blasting at least a portion of the cutting tool. Preferably the portion includes at least a section of the cutting edge or an area close to the cutting edge.

In one embodiment of the present invention the step of shot blasting is performed subsequent to the shot peening. The heat during the shot peening can reduce some positive effect from the shot blasting, such as residual stress induction in a coating, so by choosing to do the shot peening before the shot blasting both positive effects can be maintained.

In one embodiment of the present invention the shot blasting and the shot peening are performed on the same portions of the cutting tool. This is advantageous for example during a production in large scale due to a more effective loading of the cutting tools.

In one embodiment of the present invention the peening is performed in a shot direction that is perpendicular to the surface of the cutting tool. A perpendicular shot peening is advantageous in that the depth of the impacted substrate is the largest when the heated shot peening is in this direction.

In one embodiment of the present invention, the cutting tool 1 is an insert, preferably a milling insert.

The shot peening process according to the present invention can also be combined with other process steps known in the art of making cutting tools such e.g. brushing, polishing, wet blasting, dry blasting etc.

EXAMPLE

Exemplifying embodiments of the present invention will now be disclosed in more detail and compared to reference embodiments. Cutting tools (inserts) were prepared and analyzed.

Sample Preparations

Cutting tools of cemented carbide were prepared by forming substrates from raw materials according to table 1. A pre alloyed NiAl powder was used consisting of 93.9 wt % Ni and 5.3 wt % Al. The average particle size (FSSS) of WC was 5.5-6.3 μm. The amount of each raw material was based on the total dry powder weight. Substrates were manufactured according to conventional methods including mixing, milling, spray drying, pressing and sintering. The milling was performed in a mill with Co containing milling bodies, leaving Co in the powder and resulting in a Co content in the sintered cemented carbide of about 0.02 wt % Co. Cutting tools of the Insert type CNMG120408-PM were formed.

Figure 7:
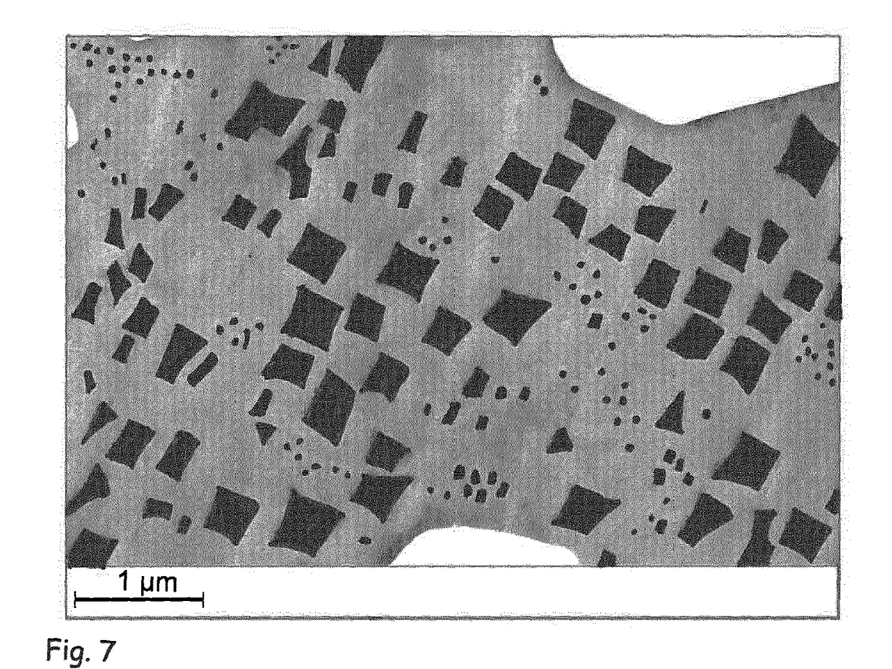
FIG. 7 is a copy of FIG. 5 but with the gamma prime phase marked up with black color.
Figure 8:
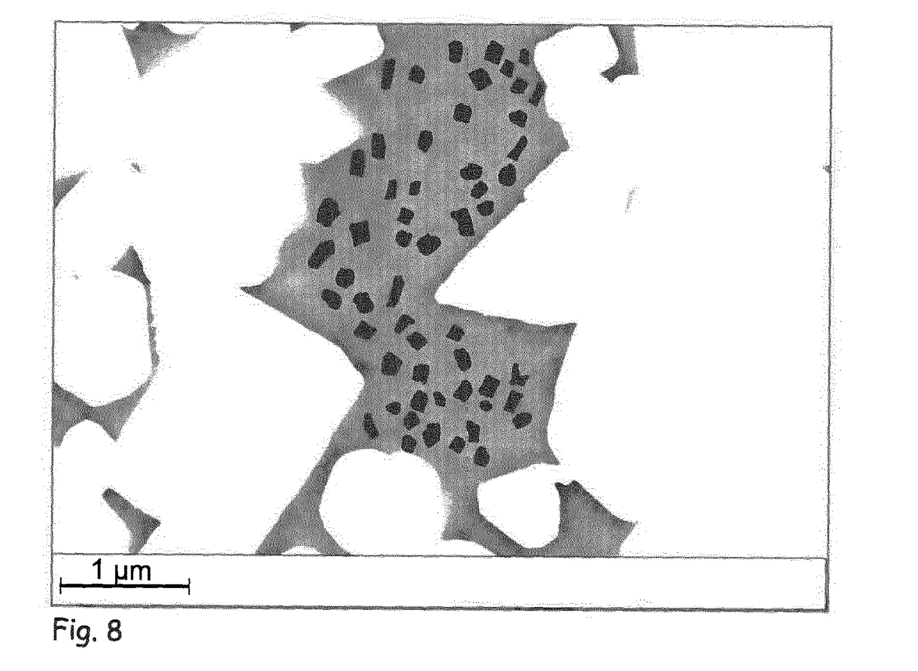
FIG. 8 is a copy of FIG. 6 but with the gamma prime phase marked up with black color.

The size of the gamma prime phase precipitates was measured by the mean linear intercept method in an SEM micrograph. The average the gamma prime phase precipitate size in Invention 1 was 150 nm and in Invention 2 it was 75 nm. The measurement of the size of each gamma prime phase was made using the equivalent circular method. The volume fraction of gamma prime phase was analysed in the SEM micrographs. For invention 1 the volume fraction in the metallic binder was 23 vol %, all phases larger than 30 nm counted, see FIG. 7. For the invention 2 the volume fraction in the metallic binder was 17 vol %, all phases larger than 30 nm counted, see FIG. 8.

TABLE 1

Raw material compositions (wt % of total dry powder weight)

| Substrate | NiAl [wt %] | $Cr_3C_2$ [wt %] | WC | Average gamma prime phase size [nm] | Fraction of gamma prime phase in metallic binder [vol %] |
|---|---|---|---|---|---|
| 1 | 10 | — | Balance | 150 | 23 |
| 2 | 9.5 | 0.45 | Balance | 75 | 17 |

Subsequent to the sintering the two types of cutting tools were subjected to shot peening at 500° C. forming Invention 1-2.

The shot peening was performed in an AUER Manual Blasting Cabinet ST 700 PS equipment. A blasting media of ceramic beads with a spherical shape and an average diameter of about 100 μm was used, media Microblast®B120. The grain size of the ceramic beads was 63-125 μm. The ceramic beads has a composition of 60-70% $ZrO_2$, 28-33% $SiO_2$ and <10% $Al_2O_3$. The shot gun pressure was set to 5 bar, the working time was set to 20 seconds, the nozzle diameter was 8 mm and the stand-off distance was 100 mm. The peening was applied perpendicular to the rake face of the cutting tools. In the case of heated shot peening the cutting tools were heated with an induction coil heater prior to the shot peening and the temperature of the cutting tools were measured with a temperature sensor. The induction heater was a Rimac induction heater, 1.5 kW.

The cutting edges of the of the cutting tools after these post-treatments were about ER 40 μm.

Vickers Measurements

Vickers indentations were made on rake faces of the cutting tools and on cross sections of the cutting tools. Vickers indentations can also be made at the flank faces.

The rake face of the samples were gently polished to achieve a suitable surface for crack length measurements. The samples were either polished using 0.25 am diamond paste on paper and polished by hand or using 0.25 μm diamond paste on a 20 mm diameter felt wheel using a Gatan Inc. Dimple Grinder model 656 with medium speed and 35g load. The polishing was conducted until a surface revealing enough polished areas for subsequent crack length measurements was achieved.

A bulk sample was prepared by cutting the insert perpendicular to the rake face using a diamond wheel and subsequently polishing using 9 am diamond dispersed in oil on paper and then 1 am diamond dispersed in oil.

The Vickers hardness of the polished samples were measured using a programmable hardness tester, KB30S by KB Pruftechnik GmbH. The measurements were calibrated against HV100 using test blocks issued by Euro Products Calibration Laboratory, UK. Vickers hardness was measured according to ISO EN6507.

Vickers hardness measurements were performed by programming the hardness tester to perform indentations at certain positions. Indentations are then performed using the specified load. At least two parallel HV100 indentations were made with a distance from each others of at least 1.5 mm and the presented result is an average value.

The lengths of the cracks at each corner of the Vickers intents were analysed and measured in Olympus BX51M light optical microscopes with a camera and computer. The specimen and camera were oriented so that the diagonals of the Vickers indents were horizontal and vertical on the computer screen. A magnification of at least 100 times was used. If the tip of the crack was difficult to find, a higher magnification was applied to locate the tip of the crack before measurement. The two diagonals of each indent were measured, and the cracks were measured as the projection onto extended diagonals of the indents from respective indent corner to the crack tip.

The hardnesses, crack lengths and crack resistances are presented in table 2.

The (2 1 1) reflection of WC located at 117.32° 2θ was used for strain measurements. The residual stress measurements were performed in 1 to 4 angular directions, φ: 0°, 90°, 180°, 270° and for each φ-direction 10 equidistant ψ-angles (0°-50°) were measured, measurement time 400 s. A collimator with 1.0 mm diameter was used in all measurements.

The resulting residual stresses were obtained from strain data by using X-ray elastic constants for WC, Bragg peak (2 1 1). The X-ray elastic constants where calculated from Poisson's ratio ν=0.191 and Young's modulus=717.360 GPa.

The samples were mounted with adhesive tape to the sample holder.

The XRD data were analyzed with software DIFFRAC EVA (Bruker) and High Score Plus (Malvern Panalytical). Software LEPTOS 7 (Bruker) was used in the residual stress analysis.

The residual stresses are presented in Table 3.

TABLE 3

Summary of residual stress results

| Cutting tool | Shot peening | Residual stress surface [MPa] |
| --- | --- | --- |
| Invention 1 | 500° C. | −2276 |
| Reference 1 | No | −311 |
| Invention 2 | 500° C. | −2275 |
| Reference 2 | No | −506 |

While the invention has been described in connection with various exemplary embodiments, it is to be understood that the invention is not to be limited to the disclosed exemplary embodiments, on the contrary, it is intended to cover various modifications and equivalent arrangements

TABLE 2

Summary of hardnesses, crack lengths and crack resistances

| Cutting tool | Shot peening | Hardness rake face H(rake) [HV100] | Hardness bulk H(bulk) [HV100] | Average crack length rake face [μm] | Average crack length bulk [μm] | Crack resistance rake face, W(rake) [N/μm] | Rake face H * W [HV100 * N/μm] |
| --- | --- | --- | --- | --- | --- | --- | --- |
| Invention 1 | 500° C. | 1225 | 1182 | 8 | 118 | 31.6 | 38 765 |
| Reference 1 | No | 1186 | | 111 | | 2.2 | 2 615 |
| Invention 2 | 500° C. | 1368 | 1306 | 17 | 192 | 14.2 | 19 449 |
| Reference 2 | No | 1316 | | 180 | | 1.4 | 1 798 |

The crack resistance of the bulk in the two inventions are 2.08 for Invention 1 and 1.36 for Invention 2. The W(rake)/W(bulk) for the two inventions are thereby 15.2 for Invention 1 and 10.4 for Invention 2.

Residual Stress Measurements

X-ray diffraction was used to determine residual stresses in the aforementioned samples through the so-called $\sin^2\psi$-method. In this method the shift of lattice spacings d (and hence the strains) are measured as a function of sample tilt angles ψ. The residual stresses are obtained from the linear slope of the strain vs $\sin^2\psi$ curve. Residual stresses are converted from strain values by using X-ray elastic constants.

The XRD measurements were performed on a Bruker Discover D8 diffractometer with Davinci design equipped with a IμS Microfocus Source (CuK$_\alpha$ radiation, λ=1.5418 Å), a Våntec-500 area detector and an % Eulerian cradle.

within the appended claims. Furthermore, it should be recognized that any disclosed form or embodiment of the invention may be incorporated in any other disclosed or described or suggested form or embodiment as a general matter of design choice. It is the intention, therefore, to be limited only as indicated by the scope of the appended claims appended hereto.

The invention claimed is:

1. A cutting tool comprising:
   a cemented carbide substrate, wherein the cemented carbide consists of hard constituents in a metallic binder, the hard constituents including WC, the WC content in the cemented carbide being 80-93 wt %, wherein the cemented carbide comprises Ni and Al, the cemented carbide having a Ni content of 3-13 wt %, a weight ratio of Co/Ni<0.33, a weight ratio of Fe/Ni <0.25, a weight ratio of Cr/Ni<0.25 and a weight ratio of 0.02<Al/(Ni+Co+Fe)<0.1; and a rake face, a flank face and a cutting edge there between, wherein a crack resistance W is defined as $$W = P/4\bar{a}$$

wherein P is a load 100*9.81 N of a Vickers hardness indentation and a is an average crack length of each crack formed at corners of the Vickers hardness indentation, and wherein a product of the hardness H (rake) at the rake face and the crack resistance at the rake face is H(rake)*W(rake)>5000 HV100*N/μm.

2. The cutting tool of claim 1, wherein the cemented carbide comprises x wt% Ni, y wt% Fe and z wt% Co and wherein 5<x+y+z<10.

3. The cutting tool of claim 1, wherein the metallic binder comprises gamma prime phase, the average grain size of the gamma prime phase being 10-1000 nm in diameter.

4. The cutting tool of claim 3, wherein the gamma prime phase includes Ni$_3$Al.

5. The cutting tool of claim 1, wherein the hardness of the rake face of the cutting tool is H(rake) and the hardness of the bulk area of the cutting tool is H(bulk) and wherein 0.90<H(rake)/H(bulk)<1.10.

6. The cutting tool of claim 1, wherein the crack resistance W as measured on the rake face of the cutting tool is W(rake), the W as measured on the flank face of the cutting tool is W(flank), and wherein W(rake)/W(flank)>5.

7. The cutting tool of claim 1, wherein the crack resistance W as measured on the rake face of the cutting tool is W(rake) and the W as measured on the bulk area of the cutting tool is W(bulk) and wherein W(rake)/W(bulk)>5.

8. The cutting tool of claim 1, wherein a compressive residual stress as measured in the surface area on the rake face of the cutting tool is >1500 MPa, wherein the stress measurement is made with X-ray diffraction and the sin$^2$ψ-method using (2 1 1) reflection of WC.

9. The cutting tool of claim 1, wherein the cemented carbide has a Ni content of 8-12 wt %, a weight ratio of Co/Ni<0.05, a weight ratio of Fe/Ni<0.05, a weight ratio of Cr/Ni<0.02, and a weight ratio of 0.04<Al/(Ni+Co+Fe)<0.07.

10. The cutting tool of am claim 1, wherein the cemented carbide has a Ni content of 8-12 wt %, a weight ratio of Co/Ni<0.05, a weight ratio of Fe/Ni<0.05, a weight ratio of Cr/Ni<0.08, and a weight ratio of 0.04<Al/(Ni+Co+Fe)<0.07.

11. The cutting tool of am claim 1, wherein the average grain size of the WC in the cemented carbide is 0.2-10 μm.

12. The cutting tool of claim 1, wherein the cemented carbide comprises one or more of Ti, Nb, Ta, Mo, W, Re, Ru.

13. The cutting tool of claim 1, wherein an edge radius, ER, of at least a part of said cutting edge is between 10 μm and 50 μm.

14. A method of treating a cutting tool comprising a cemented carbide substrate wherein the cemented carbide consists of hard constituents in a metallic binder, the hard constituents comprise WC, the WC content in the cemented carbide being 80-93 wt %, wherein the cemented carbide includes Ni and Al, the cemented carbide having a Ni content of 3-13 wt %, a weight ratio of Co/Ni<0.33, a weight ratio of Fe/Ni<0.25, a weight ratio of Cr/Ni<0.25, and a weight ratio of 0.02<Al/(Ni+Co+Fe)<0.1, wherein the cutting tool includes a rake face, a flank face and a cutting edge there between, the method comprises a step of shot peening at least on the rake face of the cutting tool to form the cutting tool of claim 1.

15. The method according to claim 14, wherein the shot peening is performed at a temperature of 100-600° C.

* * * * *